(No Model.)
A. G. MACK.
FISH HOOK.
No. 454,982. Patented June 30, 1891.
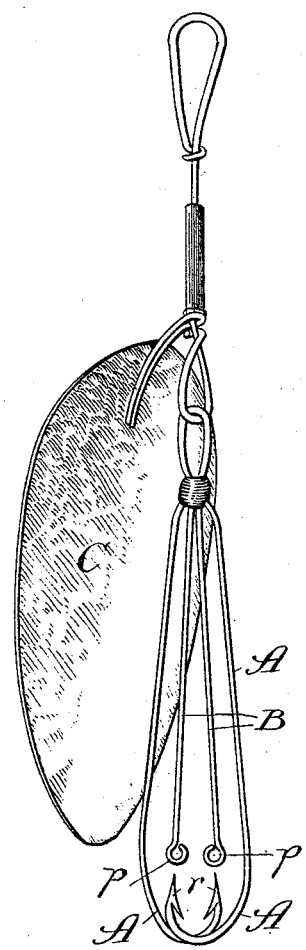
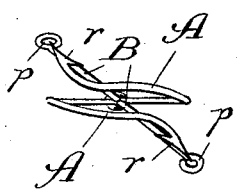
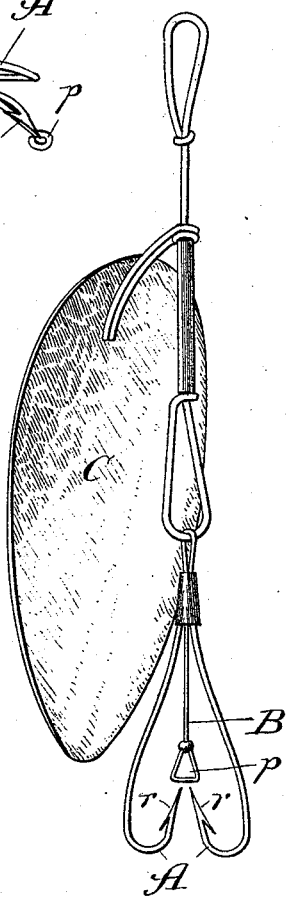
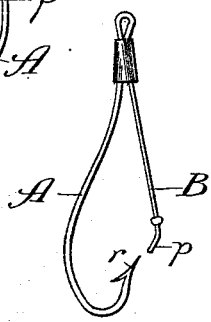
Witnesses:
Chas E Gaylord,
J. N. Dyrenforth
Inventor:
Albert G. Mack.
By Dyrenforth & Dyrenforth
Att'ys

UNITED STATES PATENT OFFICE.

ALBERT G. MACK, OF ROCHESTER, NEW YORK, ASSIGNOR OF ONE-HALF TO CHARLES E. FELTON, OF CHICAGO, ILLINOIS.

FISH-HOOK.

SPECIFICATION forming part of Letters Patent No. 454,982, dated June 30, 1891.

Application filed February 18, 1891. Serial No. 381,833. (No model.)

*To all whom it may concern:*

Be it known that I, ALBERT G. MACK, a citizen of the United States, residing at Rochester, in the county of Monroe and State of New York, have invented a new and useful Improvement in Fish-Hooks, of which the following is a specification.

The objects of my invention are to provide a fish-hook or number thereof united for use on a single line with improved means of protection against entanglement, while fishing or trolling, with weeds, and also to dispose the barb ends of at least two hooks in a cluster thereof provided with my improved weed-protecting or shielding means relatively in a manner so to present them as to insure the hooking of a fish whatever the direction the latter may strike against such hooks.

In the accompanying drawings, Figure 1 shows a fish-hook device in perspective provided with means for accomplishing both of my aforesaid objects. Fig. 2 is an end view of the cluster of hooks presented in Fig. 1. Fig. 3 presents a similar view of a cluster of fish-hooks having in common a single protector, formed in accordance with my improvement, against entanglement of the barbs with weeds. Fig. 4 is a side view of the device presented in Fig. 3.

A is a fish-hook of ordinary or any desired construction, and B is my aforesaid weed-shedding protector. The essential construction of the protector B is that of a length of springy wire or other suitably stiff and elastic material expanded at one end, where it extends normally to or about to the point of the hook-barb *r* and normally projects, as its operative position, slightly forward of the plane of the point, the wire or the like being rigidly connected at its opposite end with the hook. The preferred form of the expansion at the end of the protector B is that of an eye *p*. By this means the eye *p*, being directly over and almost in contact with but forward of the point of the hook, tends to deflect weeds, in fishing in the latter, from the sides and end of the hook.

Where two or more fish-hooks are united at their shank portions to form a cluster thereof, as represented in Fig. 1, a protector B may be provided for each member of the cluster, or, as represented in Fig. 3, the hooks may be so disposed in the cluster as to cause their points to tend toward a common center to which a single protector B extends, the expanded end or eye *p* of which is then made sufficiently wide to protect the points of all the hooks.

As represented in Fig. 1, the two hooks shown are secured together in a manner to cause their curved and barbed portions to extend in opposite directions and normally overlap each other, and toward its barbed end each is bent at the curved portion of the hook slightly outward, the protectors B being extended accordingly toward the points. This construction obviously presents the pointed ends of the hooks to a fish and insures hooking thereof, regardless of the way the fish may strike the cluster.

Each form of my improvement is shown as having a spoon C applied to it, inasmuch as it is particularly intended for use in trolling, and any suitable means, such as that illustrated, may be used for attaching the spoon.

What I claim as new, and desire to secure by Letters Patent, is—

1. In combination, a fish-hook and a springy protector B, rigidly connected at one end with the shank of the hook and expanded at its opposite end and normally extending at the expanded end to or about to the point of the hook slightly forward thereof, and disengaged in its normal protecting position from said point, substantially as described.

2. In combination, a cluster of fish-hooks united at their shanks and having their points extending toward a common center, and a protector B, having an expanded end *p*, shielding the points of the hooks in the cluster, substantially as and for the purpose set forth.

3. In combination, a cluster formed with fish-hooks united at their shanks to extend in opposite directions and overlap each other at their curved and barbed portions and each there bent to project the point of the hook outward, and protectors B, secured to the hooks and provided with expanded extremities *p*, shielding the hook-points, substantially as and for the purpose set forth.

ALBERT G. MACK.

In presence of—
LESTER G. FISHER,
ROBT. ATTRIDGE.